(12) United States Patent
Avila

(10) Patent No.: US 6,278,458 B1
(45) Date of Patent: Aug. 21, 2001

(54) METHOD OF REDUCTION AND COMPRESSION OF MODEL, AND MEDIUM FOR STORAGE THEREOF

(75) Inventor: Lisa Sobierajski Avila, Clifton Park, NY (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 09/275,104

(22) Filed: Mar. 24, 1999

(51) Int. Cl.[7] ................................................. G06T 15/00
(52) U.S. Cl. ............................................ 345/420; 345/424
(58) Field of Search .................................... 345/418, 419, 345/420, 424, 423

(56) References Cited

U.S. PATENT DOCUMENTS

| 5,345,490 | * | 9/1994 | Finnigan et al. ...................... 345/420 |
| 5,510,838 | * | 4/1996 | Yomdin et al. ....................... 348/384 |
| 5,561,749 | * | 10/1996 | Schroeder ............................ 345/420 |
| 5,592,599 | * | 1/1997 | Lindholm ............................. 345/427 |
| 6,069,634 | * | 5/2000 | Gibson ................................. 345/424 |

* cited by examiner

Primary Examiner—Cliff N. Vo
(74) Attorney, Agent, or Firm—Jill M. Breedlove; Douglas E. Stoner

(57) ABSTRACT

A rectilinear grid is positioned over a model to be compressed. Each vertex of the grid is assigned a binary value in dependence upon whether the vertex intersects the model. Cells, defined by a plurality of vertices, are arranged into elements of a series of homogeneous cells adjacent to a series of non-homogeneous cells. Each homogeneous cell is assigned a common index. Each non-homogeneous cell is assigned another index corresponding to the binary values of the non-homogeneous cell vertices. The elements are coded by storing the number of homogeneous cells, the number of non-homogeneous cells, and the index values for each non-homogeneous cell.

16 Claims, 4 Drawing Sheets

| LIST ELEMENT | NUMBER OF HOMOGENEOUS ELEMENTS | NUMBER OF NON-HOMOGENEOUS ELEMENTS | VALUES |
|---|---|---|---|
| 1 | 2 | 3 | 132 |
| 2 | 3 | 2 | 17 |
| 3 | 1 | 2 | b2 |
| 4 | 1 | 2 | 17 |
| 5 | 3 | 3 | b25 |
| 6 | 5 | 3 | a4d |
| 7 | 3 | 2 | e8 |
| 8 | 1 | 2 | 4d |
| 9 | 1 | 2 | e8 |
| 10 | 3 | 3 | 4c8 |
| 11 | 2 | | | ns
METHOD OF REDUCTION AND COMPRESSION OF MODEL, AND MEDIUM FOR STORAGE THEREOF

BACKGROUND OF THE INVENTION

This invention relates to a method of reducing and compressing a model, and in particular, to a method of reducing and compressing a model by representing the model as a binary, rectilinear grid and compressing the binary grid.

Polygonal models are often used to represent the physical objects that make up a complex system such as an aircraft engine or a nuclear reactor. These models are abundant in areas such as manufacturing and design. It is often necessary to view a large set of these models simultaneously in order to gain an understanding of a large system or to evaluate design decisions. Each model typically consists of tens of thousands of triangles, and a large system typically consists of hundreds to thousands of models. Each triangle usually contains three vertices and a normal, each requiring three components to define. This quantity of geometric primitives overwhelms current graphics processors and main memory resources, thus requiring methods that can reduce the number of polygons in a model and provide an efficient method for storing the polygonal information. There is a need in the art for methods that reduce the number of polygons in a model and compress the amount of information needed to represent the polygonal model.

BRIEF SUMMARY OF THE INVENTION

In an exemplary embodiment of the invention, a rectilinear grid is positioned over a model to be compressed. Each vertex of the grid is assigned a binary value in response to whether the vertex intersects the model. A cell, defined by a plurality of vertices, is assigned an index corresponding to the binary values of the cell vertices. The index values for a plurality of cells are stored.

DETAILED DESCRIPTION OF THE INVENTION

Figure 1:
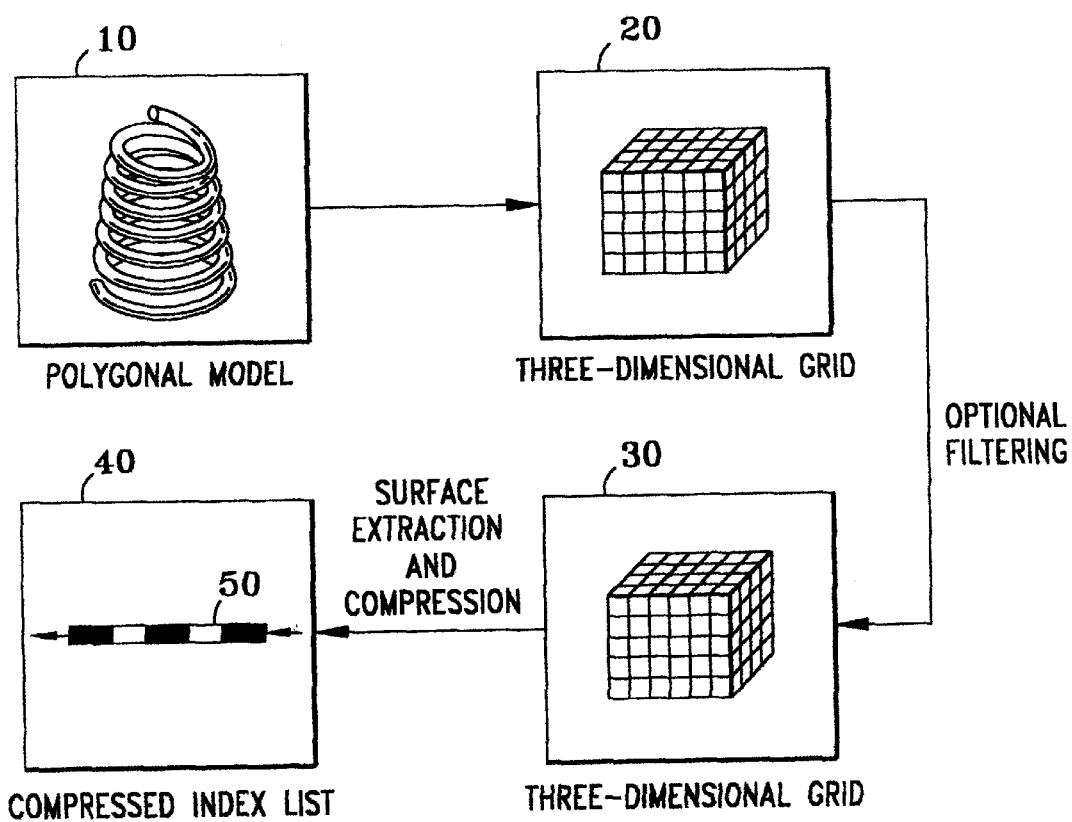
FIG. 1 is a diagrammatic flowchart of a process for compressing a polygonal model.

FIG. 1 is a diagrammatic view of the method of compressing a three-dimensional model in an exemplary embodiment of the invention. The process begins by acquiring a model 5 to be compressed as shown at step 10. A rectilinear grid is placed over the model at step 20 and preferably surrounds the model. This grid can be completely defined by a grid origin point, grid spacing values that define the distance between grid locations along each of the primary axes, and grid count values that represent the number of grid locations along each of these axes. The grid is created such that it completely contains the geometric model. The spacing and count values of the grid are determined by the desired amount of reduction and compression; for example, a grid with large spacing provides high compression but low accuracy. Each grid vertex is assigned a binary value which indicates whether the grid vertex intersects the model. If the vertex does not intersect the model, a value of 0 is assigned to the vertex, otherwise a value of 1 is assigned to the vertex.

Figure 2:
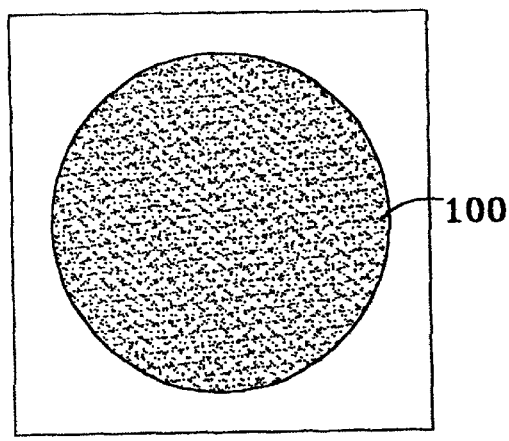
FIG. 2 illustrates a two-dimensional model to be compressed.
Figure 3:
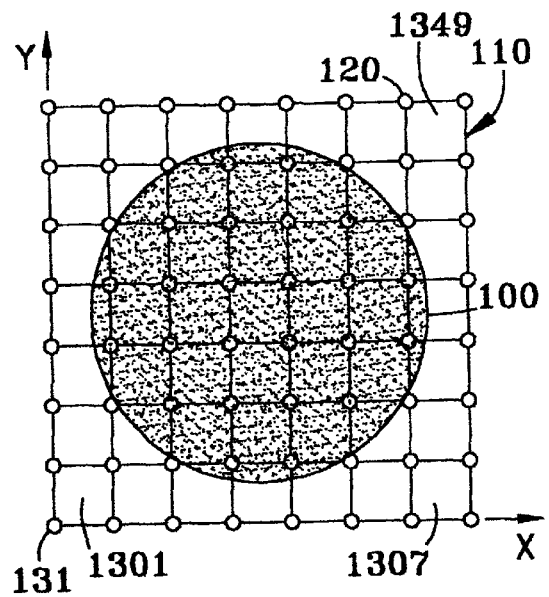
FIG. 3 illustrates placement of a two-dimensional grid over the two-dimensional model of FIG. 2.

FIGS. 2 and 3 depict a two-dimensional example of assigning grid vertices a value of 1 or 0. FIG. 2 depicts a two-dimensional model 100 to be reduced. A grid 110 is positioned over model 100 as shown in FIG. 3. Grid 110 is made up of a plurality of vertices 120. Vertices 120 intersecting the model are shown in black and are assigned a first value (e.g. 1). Vertices 120 not intersecting model 100 are shown in white and are assigned a second value (e.g. 0). Four vertices define a cell and in the example shown in FIG. 3, grid 110 is is made up of cells 1301, 1302 ... 1349. A cell made up of all 1's or all 0's is referred to as homogeneous. All other cells are referred to as non-homogeneous. As will be described herein, the cells are encoded into elements to efficiently represent the entire grid 110.

A similar process is followed when processing a three-dimensional model. A three-dimensional rectilinear grid is positioned over the model to be compressed. The three-dimensional grid is made up of a plurality of three-dimensional cells, each having 8 vertices. Vertices intersecting the model are assigned a first value (e.g. 1) and vertices not intersecting the model are assigned a second value (e.g. 0). A cell made up of all 1's or all 0's is referred to as homogeneous. All other cells are referred to as non-homogeneous. As described herein, the cells are encoded into elements to efficiently represent the entire grid.

An optional filtering process can be applied to the binary grid. The discrete representation of the model created by the grid at step 20 over-estimates the volume of the geometric object. Accordingly, a "contraction" or "shrinking" filter can be used to better approximate smooth regions of the model while eliminating small details. In addition, an interpolation or averaging operation may be applied to the grid to change the grid spacing and count values. This would allow, for example, creation of an initial grid at a high resolution, with a resolution reduction filter used to generate a grid at any desired lower resolution. The grid resolution can be reduced by converting a number of original vertices to one vertex in a reduced grid. For example, if four vertices are reduced to one vertex, the value of the new vertex is a function of the original grid vertex values (e.g. if any of the four vertices have a value of one, then the new vertex is assigned 1). Step 30 of FIG. 1 depicts the three-dimensional grid after any optional filtering.

The next step in the process is to compress the final binary grid for storage on a storage medium 50, as shown in step 40 of FIG. 1, by traversing the grid cell-by-cell. In a two-dimensional grid, a cell is a set of four neighboring grid vertices that form a rectangle. The location of a cell is determined by the grid location with the lowest X and lowest Y coordinates. In the two-dimensional example in FIG. 3, cell 1301 is identified by vertex 131. Traversal of the grid begins with the cell that has the lowest X and lowest Y coordinates and proceeds with the innermost loop on X and the outermost loop on Y. It understood that the order of traversing the grid may be varied as long as the same order is used when compressing and decompressing the grid.

In a three-dimensional grid, a cell is a set of eight neighboring grid vertices that form a rectangular box. The location of a cell is determined by the grid location with the lowest X, lowest Y, and lowest Z coordinates. Traversal of the grid begins with the cell that has the lowest X, lowest Y, and lowest Z coordinates. Traversal proceeds with the innermost loop on X, the next loop on Y, and the outermost loop on Z. It understood that the order of traversing the grid may be varied as long as the same order is used when compressing and decompressing the grid.

The cells are grouped into elements and data representing each element is stored. An element is made up of a number of adjacent homogeneous cells and a number of adjacent non-homogeneous cells. An index value is generated for each cell which corresponds to the location of 1's and 0's in the cell. The entire grid is stored as a list of elements. Each entry in the list corresponds to an element and contains the number of homogeneous cells, the number of non-homogeneous cells, and the index value for each non-homogeneous cell.

Figures 4, 5:
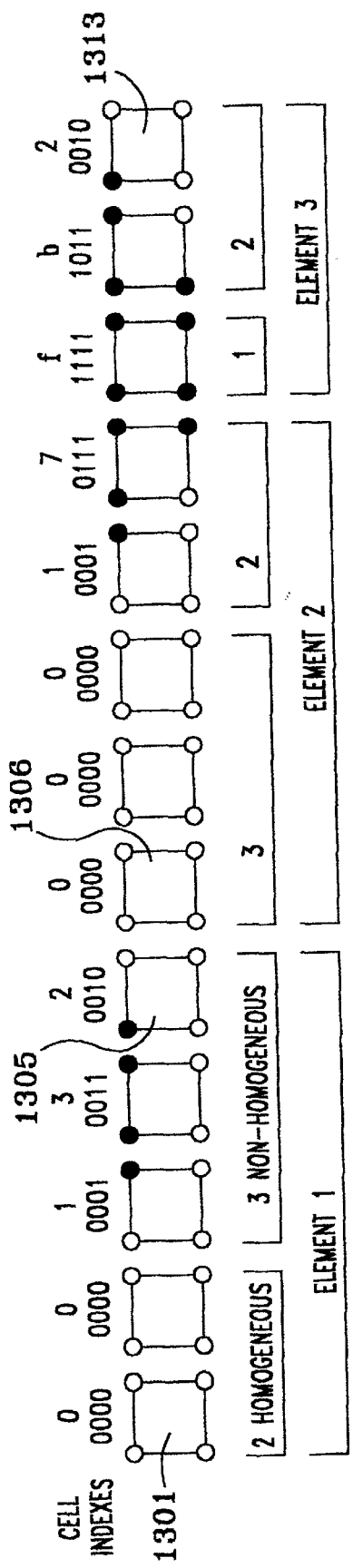
FIG. 4 depicts an arrangement of the cells of the two-dimensional grid into elements.
FIG. 5 is a table of the information stored for each element of FIG. 3.

FIG. 4 depicts the elements created for the first 13 cells 1301 to 1313 of FIG. 3. Element 1 begins with 2 homogeneous cells which are followed by 3 non-homogeneous cells. The end of element 1 is defined at the transition from non-homogeneous cell 1305 to homogeneous cell 1306. As described above, each element contains a series of homogeneous cells adjacent to a series of non-homogeneous cells. Elements 2 and 3 are similarly formed. FIG. 4 also shows the index values for each cell, positioned above each cell. The four-bit index corresponds to the four vertices of the cell. In the example shown in FIG. 4, the first bit corresponds to the vertex having the lowest x and y coordinates in the cell (i, j) and the remaining bits are ordered i+1, j; i, j+1; i+1, j+1.

FIG. 5 depicts the encoding of all the cells shown in FIG. 3. For each element, the number of homogeneous cells, the number of non-homogeneous cells and the index values for the non-homogeneous cells are stored. The index is stored as a hexadecimal number. Element 1 is stored as 2, 3, 132 which indicates that there are two homogeneous cells, followed by 3 non-homogeneous cells having index values 1, 3, and 2, respectively.

Compression of a three-dimensional grid is similar to compression of the two-dimensional grid. Cells are grouped into elements each containing a series of homogeneous cells adjacent to a series of non-homogeneous cells. Each non-homogenous cell is assigned an index based on the binary values of the vertices of the cell. The index for a three-dimensional cell represents the 8 vertices of the cell with 8 bits and is stored as two hexadecimal values. As described above with respect to the two-dimensional embodiment, for each element, the number of homogeneous cells, the number of non-homogeneous cells and the index values for the non-homogeneous cells are stored.

Figure 6:
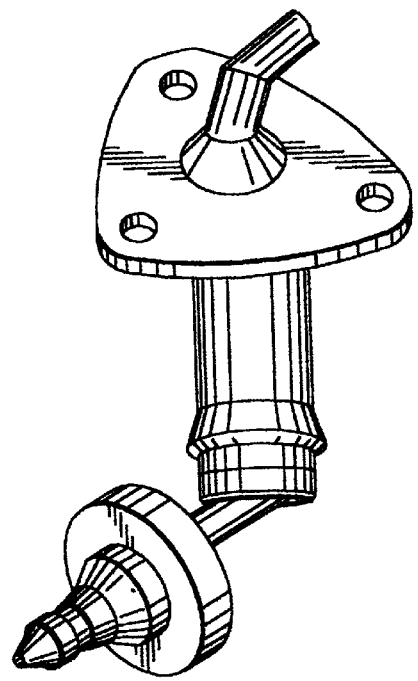
FIG. 6 is a perspective view of a three-dimensional model to be compressed.
Figure 7:
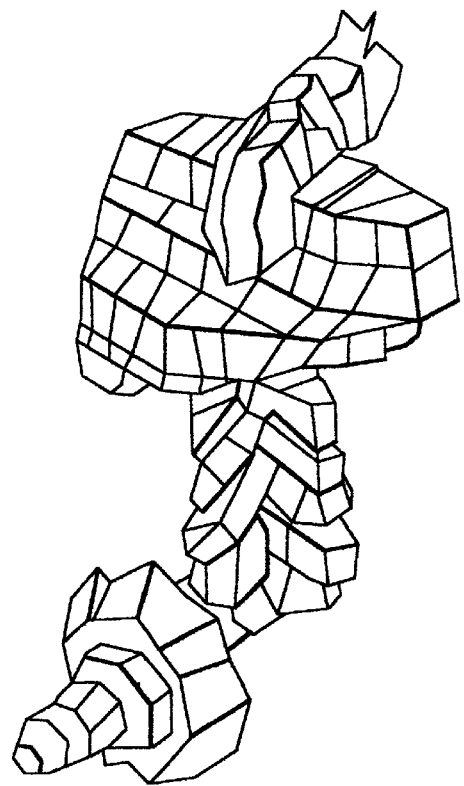
FIG. 7 is a perspective view of the three dimensional model of FIG. 6 after compression and reconstruction.
Figure 8:
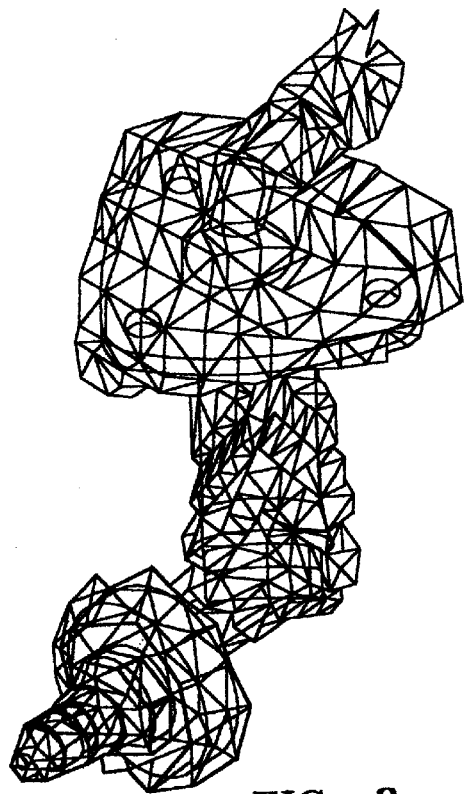
FIG. 8 is a perspective view of the three-dimensional model of FIG. 6 overlaid by a wire frame corresponding to the model of FIG. 7.
Figure 9:
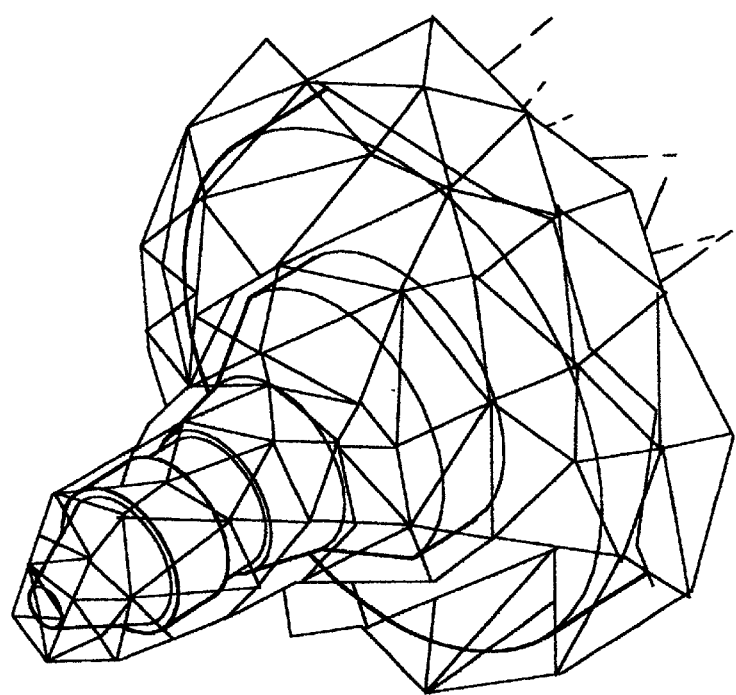
FIG. 9 is an enlarged view of a portion of FIG. 8.

FIG. 6 is a perspective view of a polygonal model to be compressed by the invention. After compression and reconstruction, the model appears as shown in FIG. 7. As is readily apparent, the compressed, reconstructed model of FIG. 7 lacks the detail of the original model shown in FIG. 6. The reduced model of FIG. 7 can, however, be displayed at interactive rates and higher detail images can be recalled if necessary. FIG. 8 depicts a wire frame of the reduced model overlaid on the original model. FIG. 9 is an enlarged view of a portion of FIG. 8. As can been seen from FIGS. 8 and 9, the reduced model provides a suitable approximation of the original model.

To recover an approximation of the original polygonal (i.e. three-dimensional) model, the stored list of elements is list is traversed element by element, and decompressed into triangles. The initial grid location, the grid spacing and count values, and the values stored in the list are sufficient to determine the three-dimensional location of each element in the list. The index stored in each element represents the binary values of the vertices of the cells of the final grid. The three-dimensional grid, with a binary value assigned to each vertex, is created from the list of elements. Using a known marching cubes method the grid can be converted into triangles that represent the original polygonal model.

The invention can be embodied in the form of computer-implemented processes and apparatuses for practicing those processes. The invention can also be embodied in the form of computer program code containing instructions embodied in tangible media, such as floppy diskettes, CD-ROMs, hard drives, or any other computer-readable storage medium, wherein, when the computer program code is loaded into and executed by a computer, the computer becomes an apparatus for practicing the invention. The invention can also be embodied in the form of computer program code, for example, whether stored in a storage medium, loaded into and/or executed by a computer, or transmitted over some transmission medium, such as electrical wiring or cabling, or fiber optics, or via electromagnetic radiation. When the computer program code is loaded into and executed by a computer, the computer becomes an apparatus for practicing the invention. When implemented on a general-purpose microprocessor, the computer program code segments configure the microprocessor to create specific logic circuits.

The invention provides a reduced-resolution representation of a large polygonal model that can be displayed at interactive rates. The slower, memory-intensive display of the high-resolution models may be used when high-detail images are necessary.

While only certain preferred features of the invention have been illustrated and described, many modifications and changes will occur to those skilled in the art. It is, therefore, to be understood that the appended claims are intended to cover all such modifications and changes as fall within the true spirit of the invention.

What is claimed is:

1. A method for compressing a model for processing comprising:

obtaining the model to be compressed;

positioning a grid relative to said model, said grid having a plurality of cells defined by a plurality of cell vertices;

assigning each of said vertices a value in dependence upon whether said vertex intersects said model;

for each one of said cells, determining an index for the cell in response to said value assigned to each of said vertices in said cell;

traversing the grid cell-by-cell; and storing the indices for each of said cells as they are traversed.

2. The method for compressing a model of claim 1 wherein said values assigned to each of said vertices are binary.

3. The method for compressing a model of claim 2 wherein, for said vertex, said value is 1 if said vertex intersects said model.

4. The method for compressing a model of claim 1 wherein:

said cells include homogeneous cells having vertices all assigned a same value and non-homogeneous cells having at least one vertex assigned a different value from another vertex;

said method further comprising:

arranging said cells in elements, each of said elements including a series of homogeneous cells adjacent to a series of non-homogeneous cells.

5. The method for compressing a model of claim 4 wherein the step of storing the indices includes:

storing for each of said elements, a first number of homogeneous cells, a second number of non-homogeneous cells, and an index for each of said non-homogeneous cells.

6. The method for compressing a model of claim 1 wherein:

said plurality of cells includes homogeneous cells having vertices all assigned a same value and non-homogeneous cells, wherein each of said non-homogeneous cells has at least one vertex assigned a different value from another vertex; and the step of storing the indices includes storing the index for each of said non-homogeneous cells.

7. The method for compressing a model of claim 4 wherein, in the traversing step, said homogeneous cells precede said non-homogeneous cells in said element.

8. The method for compressing a model of claim 1 wherein said model is a three-dimensional model and said grid is a three-dimensional grid.

9. A storage medium encoded with machine-readable computer program code for compressing a model, said code comprising instructions for causing a computer to implement a method of:

obtaining the model to be compressed;

positioning a grid relative to said model, said grid having a plurality of cells defined by a plurality of cell vertices;

assigning each of said vertices a value in dependence upon whether said vertex intersects said model;

for each one of said cells, determining an index for the cell in response to said value assigned to each of said vertices in said cell;

traversing the grid cell-by-cell; and storing the indices in said storage medium for each of said cells as they are traversed.

10. The storage medium of claim 9 wherein said values assigned to each of said vertices are binary.

11. The storage medium of claim 10 wherein, for said vertex said value is 1 if said vertex intersects said model.

12. The storage medium of claim 9 wherein:

said cells include homogeneous cells having vertices all assigned a same value and non-homogeneous cells having at least one vertex assigned a different value from another vertex;

said storage medium further comprising:

instructions for causing the computer to arrange said cells in elements, each of said elements including a series of homogeneous cells adjacent to a series of non-homogeneous cells.

13. The storage medium of claim 12 wherein said the step of storing the indices includes:

storing for each of said elements a first number of homogeneous cells, a second number of non-homogeneous cells, and an index for each of said non-homogeneous cells.

14. The storage medium of claim 9 wherein:

said plurality of cells includes homogeneous cells having vertices all assigned a same value and non-homogeneous cells, wherein each of said non-homogeneous cells has at least one vertex assigned a different value from another vertex; and the step of storing the indices includes storing the index for each of said non-homogeneous cells.

15. The storage medium of claim 12 wherein, in the traversing step, said homogeneous cells precede said non-homogeneous cells in said element.

16. The storage medium of claim 9 wherein said model is a three-dimensional model and said grid is a three-dimensional grid.

* * * * *